June 10, 1941.  F. N. ROSS  2,245,444
WHEEL STRUCTURE
Filed April 22, 1939  2 Sheets-Sheet 1

INVENTOR.
Frederick N. Ross
BY
Barnes, Kisselle, Laughlin & Raisch
ATTORNEYS

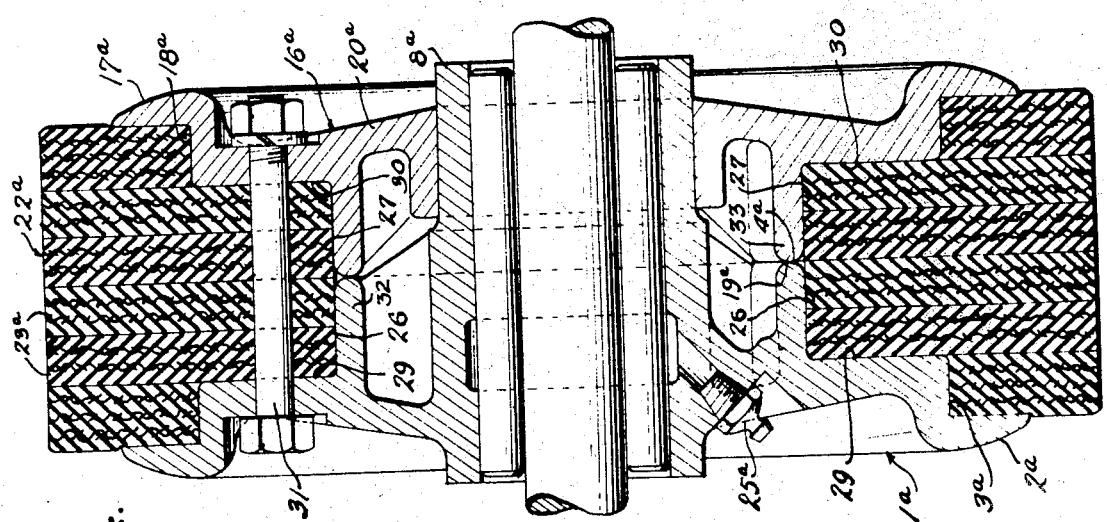
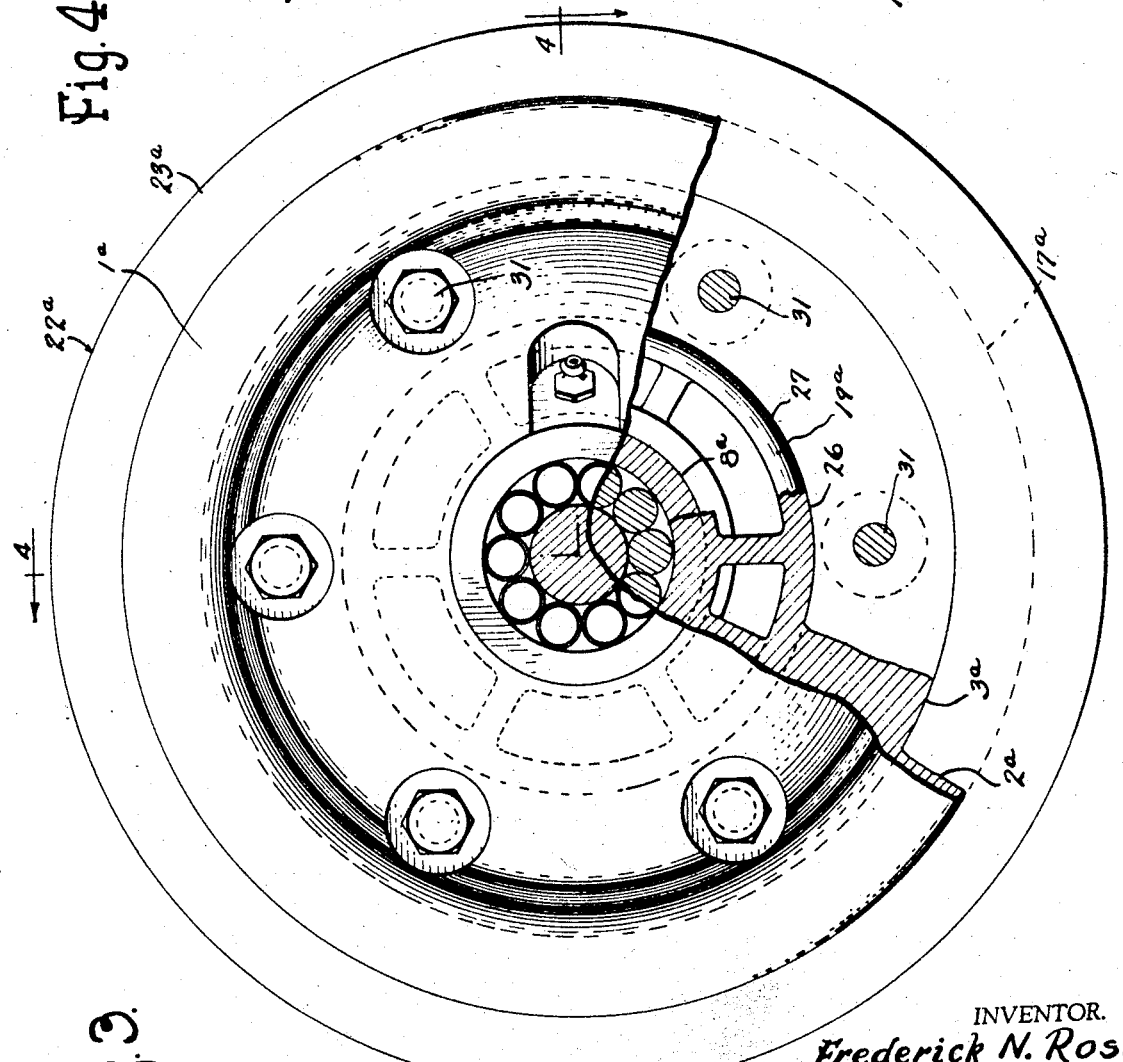

Patented June 10, 1941

2,245,444

UNITED STATES PATENT OFFICE 2,245,444

WHEEL STRUCTURE

Frederick N. Ross, Grosse Pointe Park, Mich.

Application April 22, 1939, Serial No. 269,329

3 Claims. (Cl. 301—5)

This invention relates to a wheel structure, and has to do particularly with a wheel of the type suitable for use on commercial trucks and vehicles. The trucks and vehicles in mind are those used in factories or warehouses for transferring manufactured or partly manufactured devices, or for transferring merchandise or material in the warehouses.

Among the objects of the invention is the provision of a simple, rugged wheel capable of sustaining heavy loads under all conditions of operation, one which will run true and have an indefinite life. Also, the invention is directed to a wheel of a simple rugged structure which has a removable tire of rubber or the like and wherein a tire change can be quickly and easily made. Heretofore many wheels of this type had the tires fitted thereto with a press operation and very often the user had to send the wheels out of the plant or warehouse to have new tires fitted thereto. With the present wheel the tire may be changed quickly and easily by most any available employee.

The invention is carried out by the wheel structures shown in the accompanying drawings, the drawings illustrating exemplary wheels and which are specifically described below.

Fig. 3 is a view similar to Fig. 1 illustrating a different form of wheel.

Fig. 4 is a view taken substantially on line 4—4 of Fig. 3.

Figure 2:
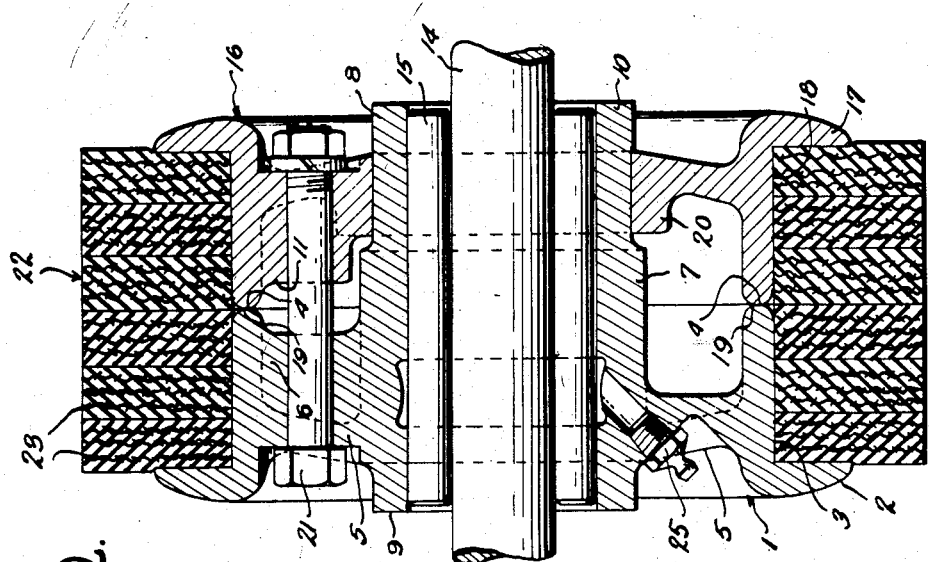
Fig. 2 is a cross sectional view taken substantially on line 2—2 of Fig. 1.
Figure 1:
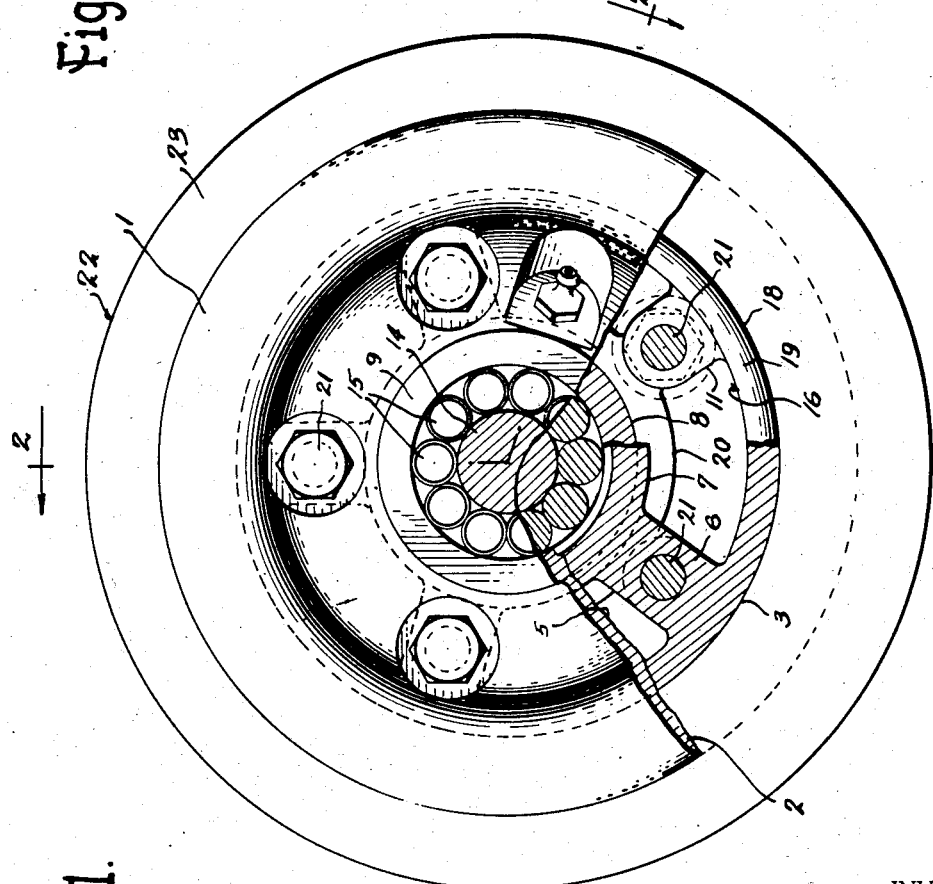
Fig. 1 is a view of a wheel constructed in accordance with the invention, partly in side elevation and with parts cut away, showing other parts in section.

The wheel structure comprises main or basic elements which may comprise castings of ferrous metal. One element is generally illustrated at 1 having a peripheral flange 2 and a rim-forming portion 3 terminating in an abutment 4. The body portion extends inwardly from the rim as illustrated at 5, and for purposes of lightness the body portion may be cut away to form webs 6. The main element 1 has a hub 7 integral with the remaining portion of this member, and the hub is extended axially as at 8 to form a pilot for the reception of the other portion of the wheel. The ends of the hub, as at 9 and 10, preferably extend a small distance axially beyond the face of the flange 2 and beyond the face of the flange of the other wheel portion. An axle or pintle is illustrated at 14 and the hub 8 is mounted thereon preferably through the means of an antifriction bearing indicated herein as being in the form of rollers 15. Of course, other bearing structures may be used. Frequently, the axle or pintle 14 is carried by a fork or caster mounted upon a vertical axis, but this is not shown herein, as some wheels may be mounted on casters and others on a fixed axle, depending upon the type of the mounting desired.

The other portion of the wheel is generally illustrated at 16 having a flange 17, a rim-forming portion 18, an abutment 19 and a central portion 20 arranged to nicely fit upon the pilot portion of the hub 8. This portion may also embody the lightened structure thus having webs 11.

These two wheel portions are assembled together by placing them in the relation illustrated and by securing them together with the means of bolts 21. The wheel portions have apertures for the passage of the bolts therethrough.

When the wheel is thus assembled it will be noted that a rim is provided for a tire. This tire is generally illustrated at 22, and the particular tire shown is made up of a plurality of laminations of rubber with fabric or cord embedded therein as illustrated, each lamination being shown at 23. One source of supply for such laminations is used casings for pneumatic tires, from the side walls of which the individual rings or laminations may be cut. However, the laminations may be especially manufactured for this purpose, or, if desired, a solid rubber tire may be used with the wheel, with or without the embedded fabric or cord. The term "fabric" is used henceforth herein to describe a substance embedded in the rubber which may be woven cotton fabric or the structure known as cord, or woven fibers of a synthetic substance. Preferably, the axial dimension of the tire is a little in excess of the dimension between the flanges 2 and 17 when the wheel portions are assembled with the parts 4 and 19 in abutment. In this case the rubber is placed under compression so that the tire is securely held in position. The main wheel portion may be provided with a lubricating fitting of any suitable type, as illustrated at 25.

In the modified form, the same reference characters are used, with the addition of the identifying character $a$. This eliminates much duplicate description. This modified form is adapted for wheels of a larger size, although it is to be understood that both forms may be used in any size wheel. The main element $1a$ has a flange $2a$ and rim-forming portion with a surface $3a$, and the hub portion indicated with the reference characters applied, while the other or removable portion 16a fits over the pilot portion of the hub 8a has the flange 17a, a portion with a surface 18a and an intermediate portion 20a and the two members having the abutting portions 4a and 19a. With this wheel, however, the rim-forming portions 3a and 18a extend toward each other for a distance, and then the structure extends axially toward the hub so as to form a circumferential recess or groove, the bottom of which is defined by portions 32 and 33 having the surfaces 26 and 27. These portions 32 and 33 have the abutment parts 4a and 19a.

The tire is shaped to fit the contour of the wheel thus formed in that the outer portion of the tire has a width such as to fit between the flanges 2a and 17a, while the intermediate portion of the tire extends inwardly axially and is of less width so as to nicely fit between the parts 29 and 30. The wheel portions are provided with holes for the passage of bolts 31 through the portions 29 and 30 and through the central part of the tire, the tire being apertured for this purpose. As shown in the modified form, the tire 22a is made up of laminations 23a, with the central laminations extending into the central circumferential recess. Of course, a homogeneous one-piece molded tire may be used with this wheel.

When both wheels are assembled, the nuts of the bolts are tightened down until the portions 4 and 19 or 4a and 19a are abutted against each other. In this way the wheel is made to run true, in that the castings are accurately formed, and when these surfaces are abutted the two portions of the wheel are brought into accurate relationship as regards each other. When the tire yields under load the portions of the wheel are not caused to yield relative to each other because they are bolted tightly together. To remove a tire, it is only necessary to remove the bolts and detach the wheel member 16 or 16a as the case may be, whereupon another tire may be placed upon the wheel. The tires preferably fit snugly upon the wheel but are arranged so that they can be mounted thereon without the use of a press or any other special equipment.

It has been found that a truck equipped with wheels of this character runs true and can easily be moved even under heavy load. In one case, an unloaded truck was given a push and sent rolling down the aisle way of a factory, and it rolled in a true line without any wobbling action. Wheels of trucks of this nature are subjected to a good deal of abuse in that they very often strike abutments or projections and are subjected to side blows, but a wheel of the structure herein has ample strength to meet these conditions, even under heavy load so that their action remains true.

I claim:

1. A wheel for an industrial truck or the like comprising, a main wheel portion having a body presenting two substantially flat surfaces on different radii, a flange at one side of the outer surface, a hub projecting axially from the body, a secondary wheel portion presenting two substantially flat surfaces on different radii corresponding to the radii of the main wheel portion, said secondary wheel portion having a flange at one side of the outer surface, said secondary wheel portion being mounted upon the extending hub, the said surfaces and flanges forming a rim which is relatively shallow at the surfaces on the large radii and relatively deep at the surfaces on the small radii, a tire shaped to fit the rim and disposed therein contacting the said surfaces, and bolts passing through the wheel portions and through the tire at points describing a circle between the inner and outer surfaces for holding the wheel portions and tire in assembly, the said tire being compressed by the said flanges and the outer periphery of said tire being cylindrical.

2. A wheel for an industrial truck or the like comprising, a main wheel portion having a body presenting two substantially flat surfaces on different radii, a flange at one side of the outer surface, a hub projecting axially from the body, a secondary wheel portion presenting two substantially flat surfaces on different radii corresponding to the radii of the main wheel portion, said secondary wheel portion having a flange at one side of the outer surface, said secondary wheel portion being mounted upon the extending hub, the said surfaces and flanges forming a rim which is relatively shallow at the surfaces on the large radii and relatively deep at the surfaces on the small radii, a tire shaped to fit the rim and disposed therein contacting the said surfaces, and bolts passing through the wheel portions and through the tire at points describing a circle between the inner and outer surfaces for holding the wheel portions and tire in assembly, said wheel portions having parts adjacent the tire abutting each other when the bolts are tightened, the said tire being compressed by the said flanges and presenting a substantially cylindrical outer surface.

3. A wheel for an industrial truck or the like comprising, a main wheel portion having a body presenting two substantially flat surfaces on different radii, a flange at one side of the outer surface, a hub projecting axially from the body, a secondary wheel portion presenting two substantially flat surfaces on different radii corresponding to the radii of the main wheel portion, said secondary wheel portion having a flange at one side of the outer surface, said secondary wheel portion being mounted upon the extending hub, the said surfaces and flanges forming a rim which is relatively shallow at the surfaces on the large radii and relatively deep at the surfaces on the small radii, a tire shaped to fit the rim and disposed therein contacting the said surfaces, and bolts passing through the wheel portions and through the tire at points describing a circle between the inner and outer surfaces for holding the wheel portions and tire in assembly, the portions on the small radii being disposed substantially in abutment and the wheel portions forming a rim relatively deep in its center portion and shallow in its outer portions, a T-shaped tire fitted in the rim and bolts passing through the wheel portions and through the stem of the T, the said tire being laterally compressed by the said flanges and the said wheel portions.

FREDERICK N. ROSS.